(12) United States Patent
Lo et al.

(10) Patent No.: US 6,269,223 B1
(45) Date of Patent: Jul. 31, 2001

(54) CAMERA FOR MONO AND STEREO PHOTOGRAPHS

(75) Inventors: Anthony Lo, Hong Kong; In Son Kwok, Kowloon, both of (HK)

(73) Assignee: Loreo Asia Limited (HK)

( * ) Notice: Subject to any disclaimer, the term of this patent is extended or adjusted under 35 U.S.C. 154(b) by 0 days.

(21) Appl. No.: 09/390,369

(22) Filed: Sep. 7, 1999

Related U.S. Application Data

(60) Provisional application No. 60/100,145, filed on Sep. 14, 1998.

(51) Int. Cl.[7] .......................... G03B 35/00; G03B 35/08
(52) U.S. Cl. ........................................ 396/322; 396/326
(58) Field of Search ................................ 396/322, 324, 396/326, 333, 449, 471, 493, 496, 497, 501, 505, 510; 352/141

(56) References Cited

U.S. PATENT DOCUMENTS

| | | | |
|---|---|---|---|
| 2,869,446 | * 1/1959 | Franceschini | 396/493 |
| 4,589,748 | * 5/1986 | Ohmura | 396/72 |
| 5,548,362 | * 8/1996 | Wah Lo et al. | 396/326 |
| 5,701,532 | * 12/1997 | Inaba | 396/326 |

* cited by examiner

*Primary Examiner*—Russell Adams
*Assistant Examiner*—Arthur A. Smith
(74) *Attorney, Agent, or Firm*—Finnegan, Henderson, Farabow, Garrett & Dunner, L.L.P.

(57) ABSTRACT

A camera for taking both stereo and mono photographs is provided. The camera includes a body that has a mono aperture and a pair of stereo apertures. The camera also includes a lens panel that has a pair of lenses. The lens panel is moveable between a mono position and a stereo position. In the mono position, one of the pair of lenses is aligned with the mono aperture to project a single image of a subject on a film exposure. In the stereo position, the pair of lenses are aligned with the pair of stereo apertures to project dual images of a subject onto a film exposure. There is further provided a shutter assembly for covering and exposing the apertures in the camera body. The shutter assembly includes a first, pivotable shutter blade and a second, pivotable shutter blade. The pivot points of the first and second shutter blades are on opposite sides of the apertures.

36 Claims, 7 Drawing Sheets

CAMERA FOR MONO AND STEREO PHOTOGRAPHS

CROSS REFERENCE TO RELATED APPLICATION(S)

This application claims priority rights under 35 U.S.C. §119(e)(1) based on provisional U.S. Patent Application 60/100,145 filed on Sep. 14, 1998.

BACKGROUND OF THE INVENTION

The present invention relates to a camera for taking both mono and stereo photographs.

The popularity of three-dimensional, or stereo, photographs is increasing along with technology advances in the field. Stereo photographs are created by projecting dual images of the same subject adjacent each other on the same exposure of film. The camera lenses that project each of the images of the subject are slightly offset from each other so that the film exposure captures to two different angles of the same subject. The resulting effect of the developed film, when viewed through an appropriate viewer, is a three-dimensional, or stereo, photograph.

However, standard cameras are typically incapable of taking stereo photographs. This is because standard cameras include only a single lens and a single aperture for capturing a single image of the subject. To achieve a stereo photograph, the camera must have two lenses and apertures that are appropriately separated to create the dual images of the same subject. However, since standard cameras include a single lens and a single aperture, they are not capable of projecting dual images onto a single exposure of film.

In addition, the shutter mechanism of a standard camera is not capable of exposing multiple apertures for equal time periods. To generate a quality stereo photograph, both of the dual images of the subject should be projected onto the exposure of film for the same amount of time so that the film may properly capture the image. However, conventional shutter mechanisms usually include two shutter blades that pivot in opposite directions about a common pivot point. The two blades pivot away from each other to open the shutter to reveal an aperture, thereby allowing light to enter the camera to expose the film and capture an image. The shutter blades remain open long enough to expose the film and then pivot back towards each other to close the shutter and cover the aperture. However, if the camera included two apertures, one of the apertures would necessarily be farther away from the pivot point and would become exposed quicker and stay exposed longer than the aperture closer to the pivot point. Thus, with a conventional shutter design, the apertures will not provide equal exposure of the image light to the film. This will result in a very poor quality stereo photograph.

Since standard cameras are incapable of talking quality stereo photographs, a photographer wishing to take both standard and stereo photographs would have to use a separate camera for each type of image. Carrying two different cameras and switching between the cameras to take different photographs can be inconvenient. Since most photographers desire to only take an occasional stereo photograph, very few photographers would consider carrying a separate stereo camera loaded with a separate roll of film in addition to a standard camera.

In light of the foregoing there is a need for a camera that has a simple design and is capable of taking both mono and stereo photographs.

SUMMARY OF THE INVENTION

Accordingly, the present invention is directed to a camera for taking both mono and stereo photographs that substantially obviates one or more of the limitations and disadvantages of prior art cameras. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the present invention is directed to a camera that includes a body. The body of the camera has a mono aperture and a pair of stereo apertures. The camera also includes a lens panel that has a pair of lenses. The lens panel is moveable between a mono position and a stereo position. In the mono position, one of the pair of lenses is aligned with the mono aperture to project a single image of a subject on a film exposure. In the stereo position the pair of lenses are aligned with the pair of stereo apertures to project dual images of a subject onto a film exposure.

In another aspect, the invention is directed to a shutter assembly for a camera that has an aperture. The shutter assembly includes a first shutter blade that has a first pivot point and is moveable between a closed position and an open position and a second shutter blade that has a second pivot point and is moveable between a closed position and an open position. The first and second pivot points are disposed on opposite sides of the aperture and the first and second shutter blades cooperate to cover the aperture when both of the shutter blades are in the closed position. The shutter assembly also includes an actuator that moves the first and second shutter blades to the open position to expose the aperture for a predetermined time period.

In yet another aspect, the present invention is directed to a camera having a body and a pair of lenses. The body of the camera includes a mono aperture and a pair of stereo apertures. There is provided a means for moving the lenses between a mono position and a stereo position. In the mono position, one of the pair of lenses is aligned with the mono aperture to project a single image of a subject onto a film exposure. In the stereo position the pair of lenses are aligned with the pair of stereo apertures to project dual images of a subject onto a film exposure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to the presently preferred embodiment of the invention, an example of which is illustrated in the accompanying drawings. Wherever possible, the same reference numbers will be used throughout the drawings to refer to the same or like parts.

In accordance with the present invention, a camera for taking both mono and stereo pictures is provided. The camera includes a body having a mono aperture and a pair of stereo apertures. An exemplary embodiment of the camera of the present invention is illustrated in FIG. 1 and is generally designated by reference number 20.

Figure 1:
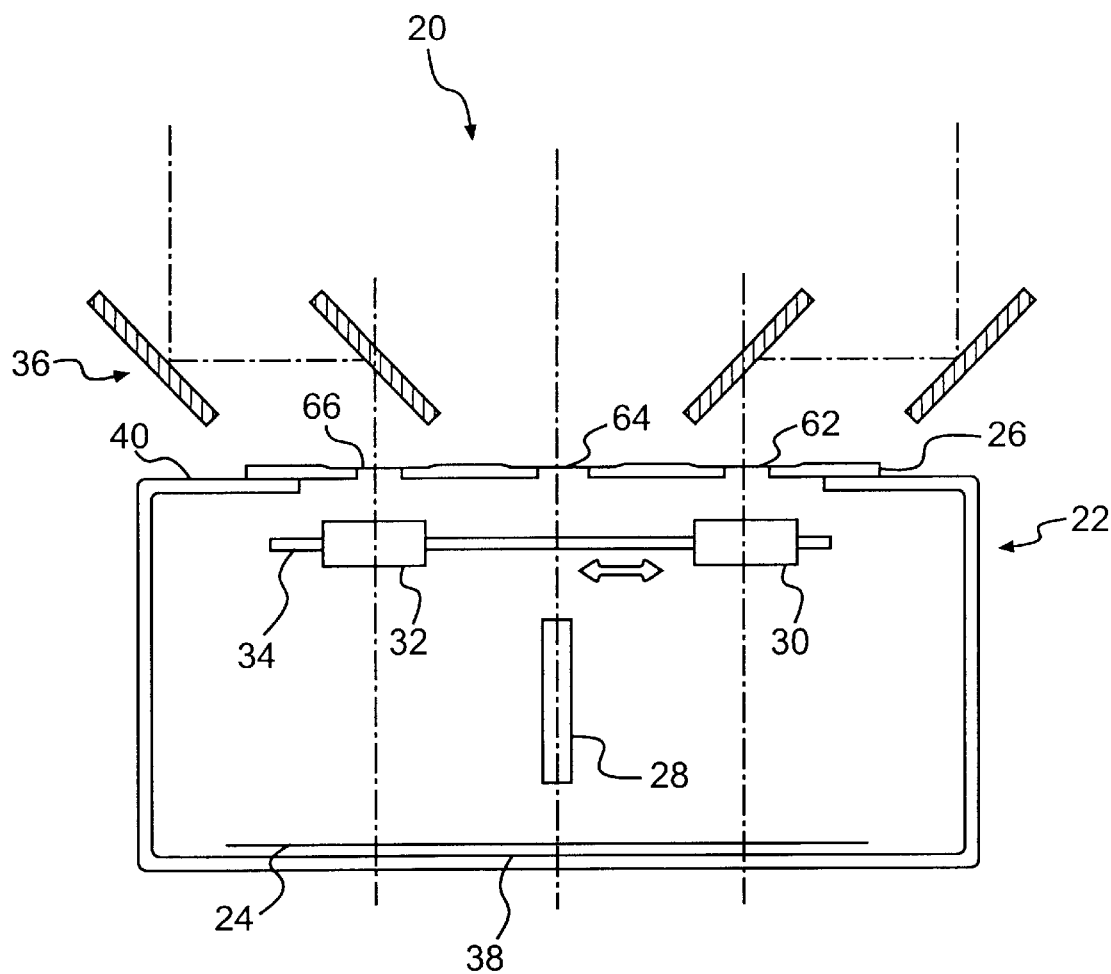
FIG. 1 is a top sectional view of a camera according to the present invention.

As illustrated in FIG. 1, camera 20 includes a light-tight camera body 22. Camera body 22 preferably has a film compartment (not shown) for holding a roll of film and a film winding mechanism (not shown). The winding mechanism may be operated to advance film 24 along a side 38 of camera body 22. The winding mechanism advances the film so that each exposure of film in the roll is successively positioned within the camera body for exposure to light reflected by a photographic subject to capture an image of the subject.

In the exemplary embodiment, the camera body is adapted for use with 35 mm film, although the present invention contemplates that the camera body may be adapted for use with any type of film. In another embodiment, the camera body may be adapted to capture images digitally with a CCD chip or other similar digital device. In yet another alternative, the camera body may be adapted to capture images on videotape.

In accordance with the present invention, the camera includes a shutter assembly for covering and exposing the mono and stereo apertures. The shutter assembly includes a first shutter blade and a second shutter blade. Both of the shutter blades are pivotably mounted on the body of the camera and the pivot points of the shutter blades are on positioned on opposite sides of the apertures.

As shown in FIG. 1, shutter assembly 26 is mounted on one side 40 of camera body 22. Shutter assembly 26 is disposed opposite of film 24. Preferably, shutter assembly 26 includes an adjustable iris, although the present invention contemplates that the shutter and adjustable iris may be separate units.

Figure 2:
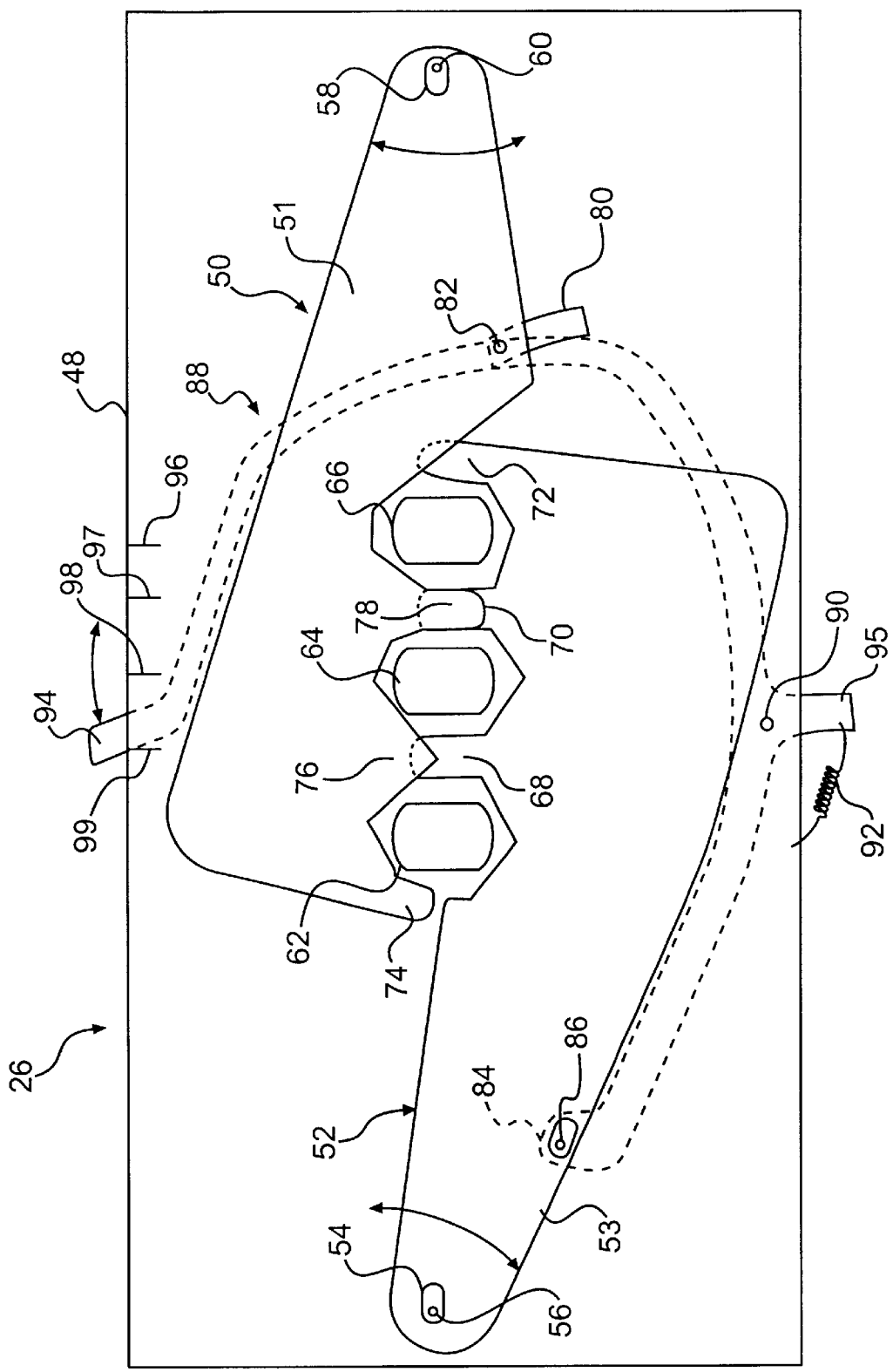
FIG. 2 is a front view of a shutter and iris combination in an open position, according to the present invention.

As illustrated in FIG. 2, shutter assembly 26 includes a shutter plate 48, a first blade 50, and a second blade 52. Shutter plate 48 defines a mono aperture 64 and two stereo apertures 62 and 66. Each of the apertures 62, 64, and 66 are configured to allow light to enter camera body 22. Preferably, each aperture has a straight vertical edge. These straight edges ensure a sharp cutoff exists on the image exposed to the film.

First and second blades 50 and 52 are mounted on a shutter plate 48. First blade 50 includes an elongated opening 58. A pin 60 is disposed through elongated opening 58 and is connected to side 40 of camera body 22. Elongated opening 58 is shaped to allow first blade 50 to both pivot and slide about pin 60. The range of sliding motion of first blade 50 is limited by the shape of elongated opening 58.

Similarly, second blade 52 includes an elongated opening 54. A second pin 56 is disposed through elongated opening 54 and is connected to side 40 of camera body 22. Elongated opening 54 of second blade 52 is also shaped to allow the second blade to both pivot and slide about pin 56. The range of sliding motion of second blade 52 is limited by the shape of elongated opening 54.

An actuator 88 is disposed on the opposite side of shutter plate 48 from first and second blades 50 and 52. Actuator 88 is pivotally mounted on shutter plate 48 by a pin at pivot point 90. Actuator 88 is connected to first blade 50 by a pin 82 and to second blade 52 by a second pin 86. Each connecting pin 32 and 86 is disposed within a slot 80 and 84, respectively, defined by shutter plate 48. The actuator 88 is shaped to provide a connection between the pivot point 90, first blade 50, and second blade 52 without interfering with apertures 62, 64, and 66. One end 94 of actuator 88 extends past shutter plate 48.

The range of motion of actuator 88 is defined by the length of slots 80 and 84 in shutter plate 48. Preferably, actuator 88 has several positions within the range of motion. As shown in FIG. 2, end 94 is moveable between a park position 96, a closed position 97, a partially-open position 98, and a fully-open position 99 (as illustrated in FIG. 2). A spring 92 is connected to a second end 95 of actuator 88 positioned below pivot point 90. Spring 92 biases actuator 88 into the closed position.

First blade 50 includes a body 51 having a series of three projections 74, 76, and 78. Second blade 52 includes a body 53 that has a series of three projections 68, 70, and 72. Each of the projections on first and second blade 50 and 52 are configured to define notches that create openings to expose apertures 62, 64, and 66 and allow light to enter camera body 22 when the shutter is in the partially-open position 98 or the fully-open position 99. Body 51 of first blade 50 and body 53 of second blade 52 cover apertures 62, 64, and 66 when the shutter is in the closed position 97 or the park positions 96 to prevent light from entering camera body 22.

To open the shutter, actuator end 94 is moved relative to the shutter plate, thereby causing actuator 88 to pivot about pivot point 90. Preferably, actuator end 94 is moved by a spring-loaded striker mechanism that is operably connected to the film winding mechanism, although various alternatives will be readily apparent to one skilled in the art. The pivoting motion of actuator 88 causes first blade 50 to pivot and slide in a generally clockwise direction about pin 60. Likewise, the pivoting motion of actuator 88 causes second blade 52 to pivot and slide in a generally clockwise direction about pin 56. The respective motions of the first and second blades create openings between the blades, thereby exposing apertures 62, 64, and 66 and allowing light to enter camera body 22.

Preferably, pins 60 and 56 are substantially horizontally aligned with apertures 62, 64, and 66 and are positioned an equal distance on either side of the apertures. This positioning ensures that the opening created by the blades adjacent to each aperture opens and closes at the same time. Thus, the disclosed shutter assembly ensures that each aperture receives an equal exposure to light.

The amount of light that enters the camera body is controlled by the amount of movement of actuator 88. If the motion of actuator 88 is stopped at the partially-open position 98, the first and second blades will only expose part of apertures 62, 64, and 66. In this manner, the shutter assembly can act as an adjustable iris to control the amount of light entering the camera body.

The present invention contemplates that a light sensitive mechanism (not shown) may be used to control the amount of light entering the camera body. This light sensitive mechanism may limit the travel of the actuator based on the sensed light conditions. Based on the sensed light conditions, the shutter assembly may either open fully or partially, thereby ensuring the proper amount of light enters the camera body to expose the film.

When actuator end 94 is released, spring 92 acts on actuator 88 to pivot it back to the closed position. This pivoting motion causes first blade 50 to pivot generally counter-clockwise about pin 60 and second blade 52 to pivot generally counter-clockwise about pin 56. In the closed position, the body of each blade covers each of the apertures to prevent light from entering the camera.

In accordance with the present invention, a lens panel is provided in the camera body. The lens panel includes a pair of lenses and is moveable between a mono position to take a standard photograph and a stereo position to take a stereo photograph.

As illustrated in FIG. 1, a lens panel 34 is positioned between shutter 26 and film 24. A pair of matched lenses 30 and 32 are mounted in lens panel 34. Preferably, lens panel 34 is made of a light-weight material which is light-tight with the exception of lenses 30 and 32.

Figure 3:
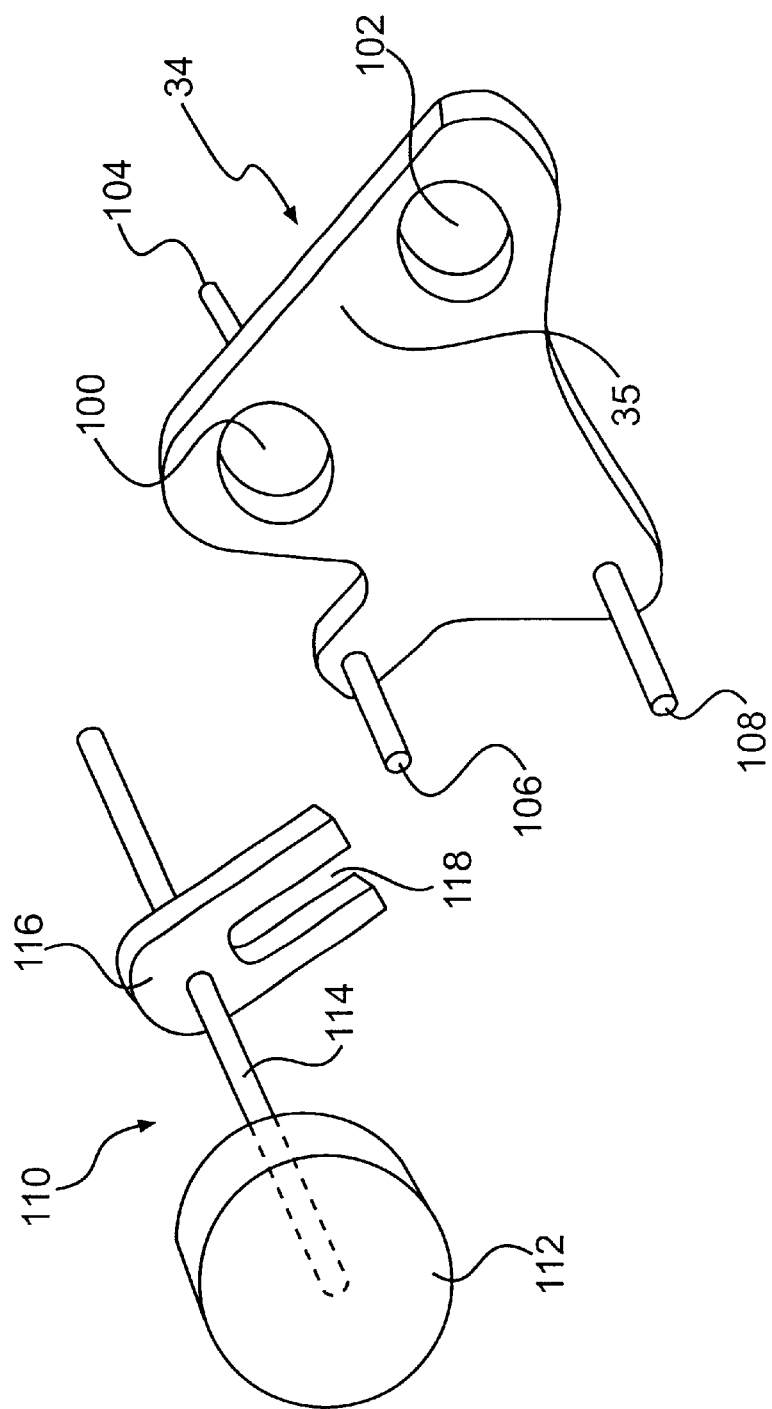
FIG. 3 is a perspective view of a lens panel and a selector according to a preferred embodiment of the present invention.

As shown in FIG. 3, lens panel 34 defines a pair of openings 100 and 102 that are configured to receive the matched pair of lenses 30 and 32. Lens panel 34 is pivotally mounted in camera body 22 on a shaft 108. Lens panel 34 may be pivoted about shaft 108 between a stereo position and a mono position.

Figure 4:
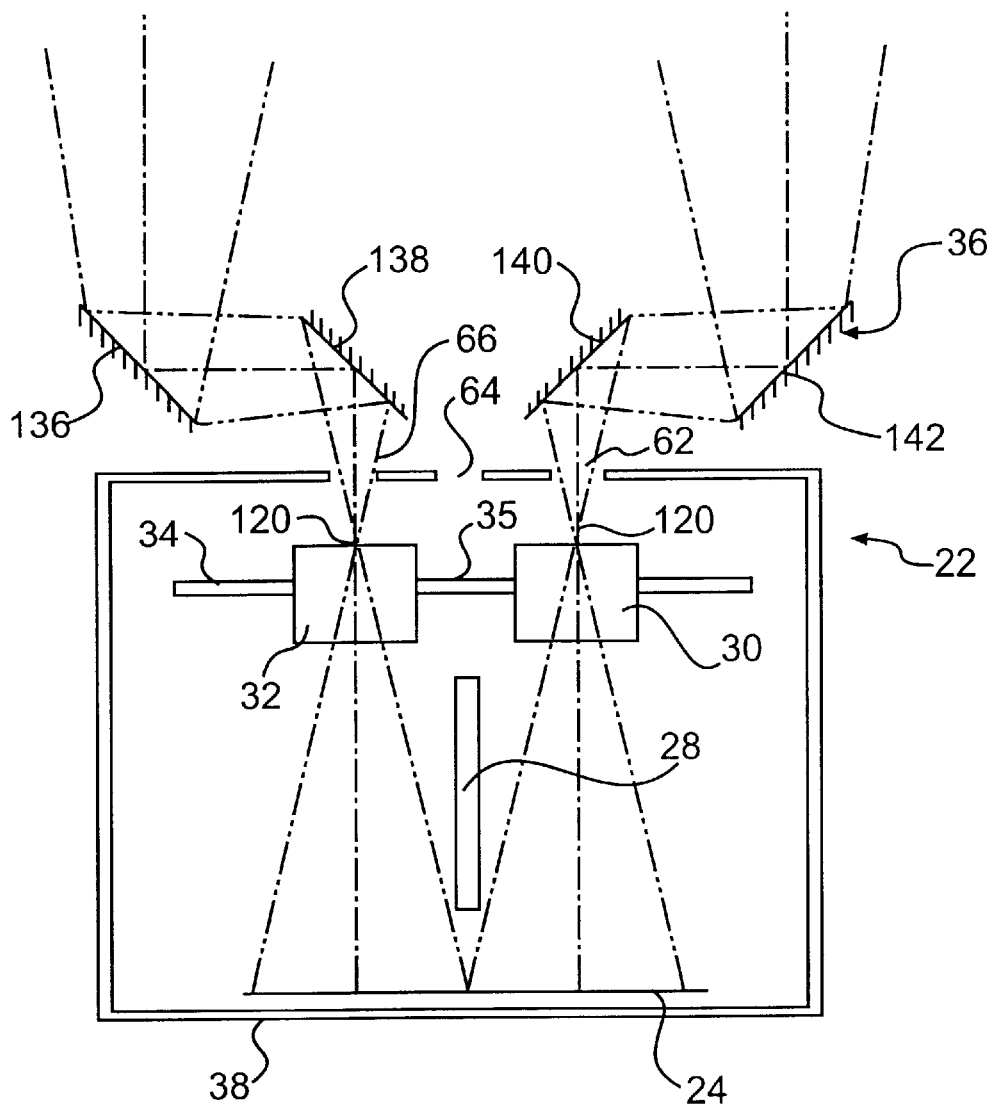
FIG. 4 is a top sectional view of a camera according to the present invention, illustrating the stereo position.

As illustrated in FIG. 4, when lens panel 34 is in the stereo position, openings 100 and 102 and, thus, lenses 30 and 32, are aligned with the stereo apertures 62 and 66 defined in shutter plate 48. In this position, the central portion 35 of lens panel 34 aligns with the mono aperture 64 to prevent the light entering this aperture from reaching and exposing film 24 when shutter 26 is opened. Thus, in the stereo position, light is allowed to enter the camera through stereo apertures 62 and 66 and pass through lenses 30 and 32 to expose film 24 with the dual images required to generate a stereo photograph.

Figure 5:
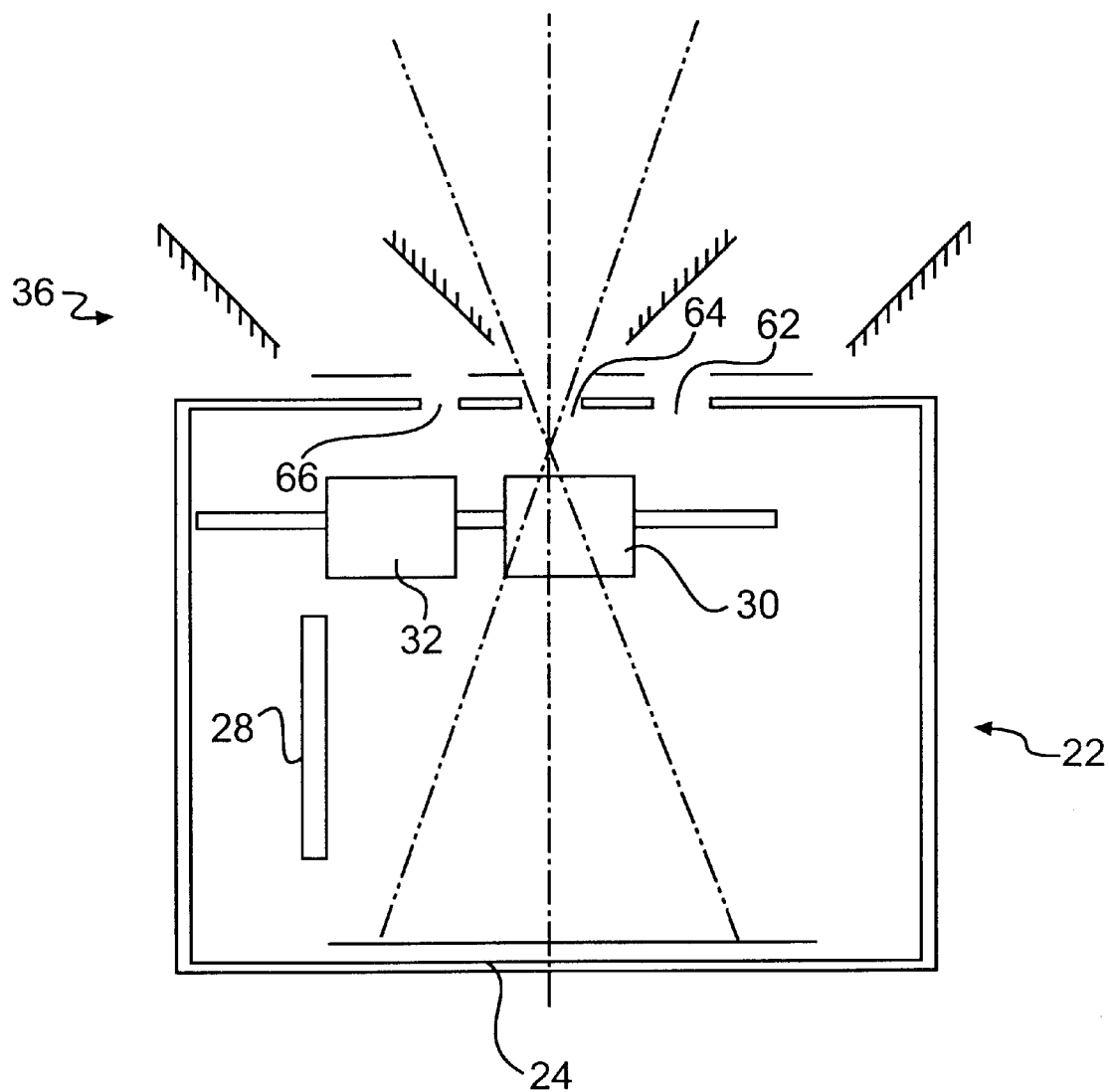
FIG. 5 is a top sectional view of the camera of FIG. 4, illustrating the mono position.

As illustrated in FIG. 5, when lens panel 34 is pivoted to the mono position, opening 100 and lens 30 align with mono aperture 64. Light is prevented from entering stereo apertures 62 and 66 by lens panel 34. Lens 30 focuses the light entering through mono aperture 64 to expose a single image on film 24 and generate a standard, mono photograph.

As shown in FIG. 3, a selector 110 is provided to pivot lens panel 34 between the stereo and mono positions. Selector 110 includes a knob 112 and a U-shaped member 116 connected by a shaft 114. Shaft 114 is rotatably mounted in camera body 22. U-shaped member 116 defines a slot 118 that engages a pin 106 on lens panel 34. Knob 112 may be rotated to move the lens panel between the stereo and mono positions. When knob 112 is rotated, u-shaped member 116 contacts pin 106 to pivot lens panel 34. As lens panel 34 pivots, pin 106 slides within slot 118. In this manner, the user may easily switch between taking mono photographs and taking stereo photographs.

Preferably, lens panel 34 is mounted within the camera body such that it may slide towards and away from the film. The focus of the lenses may be adjusted in this manner. It is contemplated that the movement of the lens panel to focus image may be performed automatically or manually.

As shown in FIG. 1, a partition 28 is provided within camera body 22. The partition is positioned between lens panel 34 and film 24. Preferably, the partition is made of a light-weight material, such as plastic.

As shown in FIG. 4, when lens panel 34 is in the stereo position, partition 28 is centered between the pair of lenses 30 and 32. Partition 28 is configured to prevent light entering one of lenses 30 and 32 from interfering with light entering the other lens when the lens panel is in the stereo mode. This enables two distinct images to be formed on the image capturing film 24. In addition, the partition provides a sharp cut off to the two images to provide a crisp joint between the images and enhance the quality of the stereo photograph.

Figure 6:
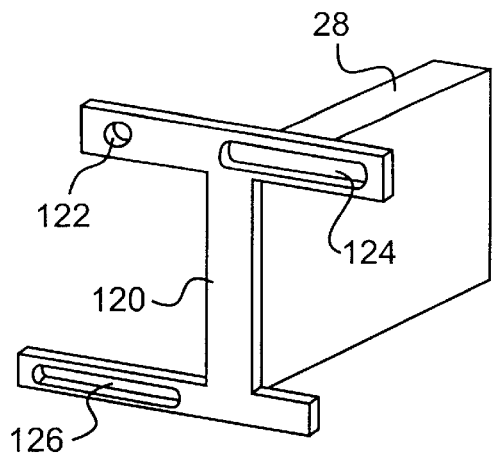
FIG. 6 is a perspective view of a partition according to a preferred embodiment of the present invention.

As shown in FIG. 6, partition 28 is connected to a support member 120. The upper portion of support member defines a slot 124 and an opening 122. The lower portion of support member 120 defines a second slot 126. Support member 120 is slidably mounted within camera body by pins (not shown) that engage each slot 124 and 126.

A pin 104 on lens panel 34 (referring to FIG. 3) engages opening 122 in support member 120. When lens panel 34 is pivoted from the stereo position to the mono position, pin 104, which is engaged with opening 122, causes support member 120 and attached partition 28 to slide within the camera body. The shape of slots controls the range of motion of the support member 120. Because lens panel 34 is connected to support member 120, the shape of slots 124 and 1.26 also control the range of motion of lens panel 34.

Preferably, as illustrated in FIG. 3, the distance between shaft 108 and pin 104 is greater than the distance between shaft 108 and pin 106. This configuration ensures that pin 104 will move a greater distance than pin 106 when lens panel 34 is pivoted about shaft 108 from the stereo position to the mono position. Thus, as illustrated in FIG. 5, partition 28 slides from a position between lenses 30 and 32 to a position removed from the path of light entering the mono aperture 64. In this manner, partition 28 may be easily moved to allow a single image to be captured on film 24.

In accordance with the present invention, a beam splitter is provided. The beam splitter defines a mono light passage to allow light reflected from a photographic subject to enter the mono aperture and a pair of stereo light passages to allow light reflected from a photographic subject into the pair of stereo apertures.

As illustrated in FIG. 1, a beam splitter 36 is mounted on camera body 22. Preferably, the beam splitter includes a key (not shown) that corresponds to a notch (not shown) on shutter plate 48. The key and notch combination will ensure that beam splitter is property aligned on camera body 22.

Figure 7:
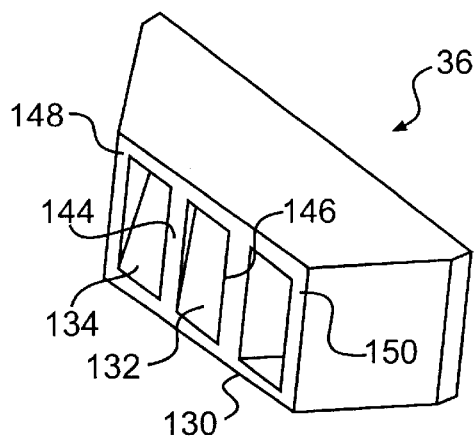
FIG. 7 is a perspective view of a beam splitter according to the present invention.
Figure 8:
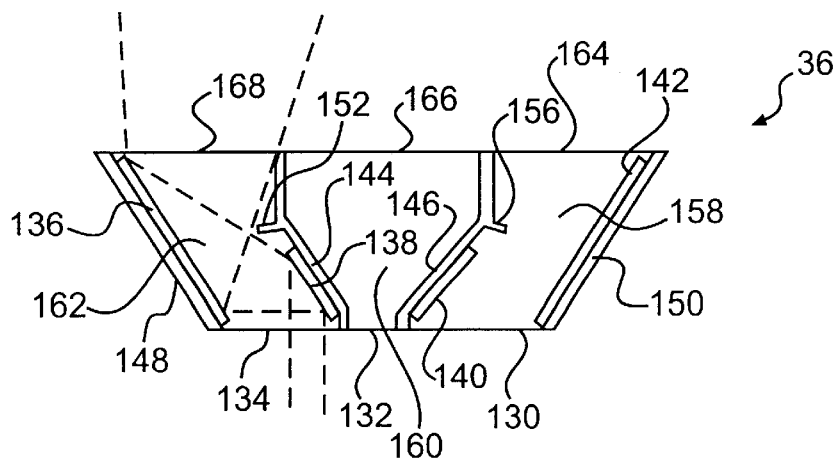
FIG. 8 is a top sectional view of the beam splitter of FIG. 7.

As shown in FIGS. 7 and 8, beam splitter 36 includes two partitions 144 and 146 that define a mono light passage 160 and two stereo light passages 158 and 162. Each of the light passages 158, 160, and 162 have an inner opening 130, 132, and 134 and an outer opening 164, 166, 168, respectively. Inner openings 130, 132, and 134 are configured to correspond with apertures 62, 64, and 66, respectively. Preferably the parallax of outer openings 164 and 168 for the stereo light passages is about 65 mm, which is approximately equivalent to the distance between a user's eyes. This positioning will help ensure a realistic stereo photograph is produced.

Light reflected from a photographic subject enters beam splitter 36 through each of the outer openings 158, 160, and 162. Light entering outer opening 160 for the mono light passage 160 passes through inner opening 132 and into the mono aperture 64 of shutter 26. Light entering openings 164 and 168 for stereo light passages 158 and 162 is intercepted by mirrors 136, 138, 140, and 142 and redirected into stereo apertures 62 and 66 of shutter 26.

Mirror 136 is mounted on a wall 148 of beam splitter 36. A second mirror 138 is positioned along partition 144. Mirrors 136 and 138 are positioned such that light from one point of view of the subject is reflected through opening 134 and into aperture 66. An extension 152 of partition 144 prevents light from directly entering aperture 66.

Similarly, mirrors 140 and 142 are mounted on partition 146 and wall 150, respectively, of beam splitter 36 to direct light from a second point of view of the subject into aperture 62. An extension 156 of partition 146 prevents light from directly entering aperture 62.

As shown in FIG. 4, light passing through aperture 62 is focused by lens 30 on film 24 to form a first image. Light passing through aperture 66 is focuses by lens 32 on film 24 to form a second image. Preferably, the distance between the first and second images is about 18 mm.

Figure 9:
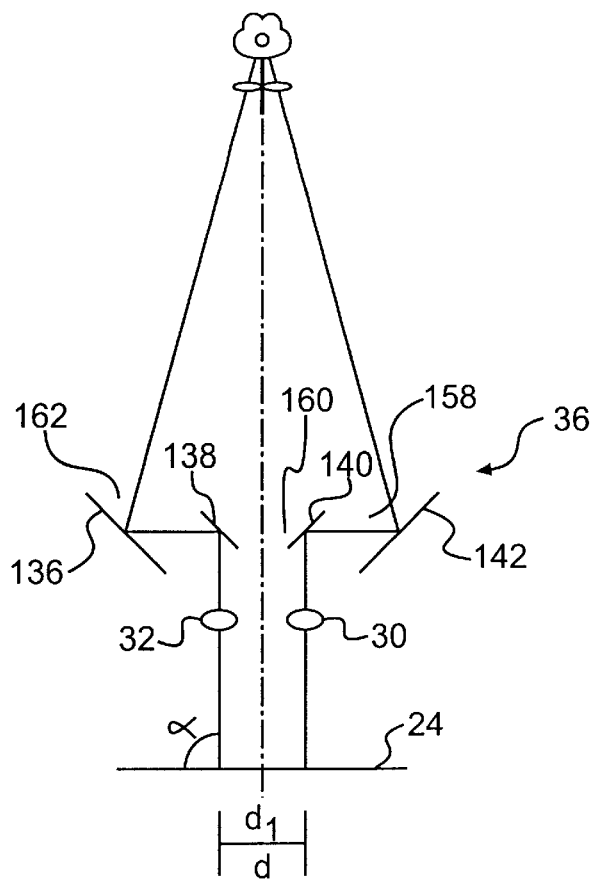
FIG. 9 is a schematic view of a preferred embodiment of a beam splitter and lens combination, illustrating the light paths from a subject to the film.

In one preferred embodiment and as illustrated in FIG. 9, the distance $d_1$ between lenses 30 and 32 is substantially equivalent to the distance d of the dual images, or about 18 mm. To achieve this lens spacing, lenses 30 and 32 are small aperture lenses that are designed to operate from front to back so that the aperture of each lens is positioned adjacent inner openings 130 and 134, respectively, in beam splitter 36.

As shown in FIG. 4, the apertures 120 of lenses 30 and 32 are the points in each lens at which the light path diverges. As the apertures 120 of the lenses move away from reflective mirrors 138 and 140, the mirrors must be made larger to embrace the whole image. If mirrors 138 and 140 become too large, the mirrors will expand into the mono light passage 160 thereby interfering with the light entering the camera through mono aperture 64.

In another preferred embodiment, the distance between lenses 30 and 32 is greater than the distance between the first and second images. Preferably, the distance between lenses 30 and 32 is no more than about 5 mm greater than the distance between of the first and second images. In an embodiment where the camera body is adapted for use with 35 mm film, the distance between lenses 30 and 32 is preferably about 20 mm.

Figure 10:
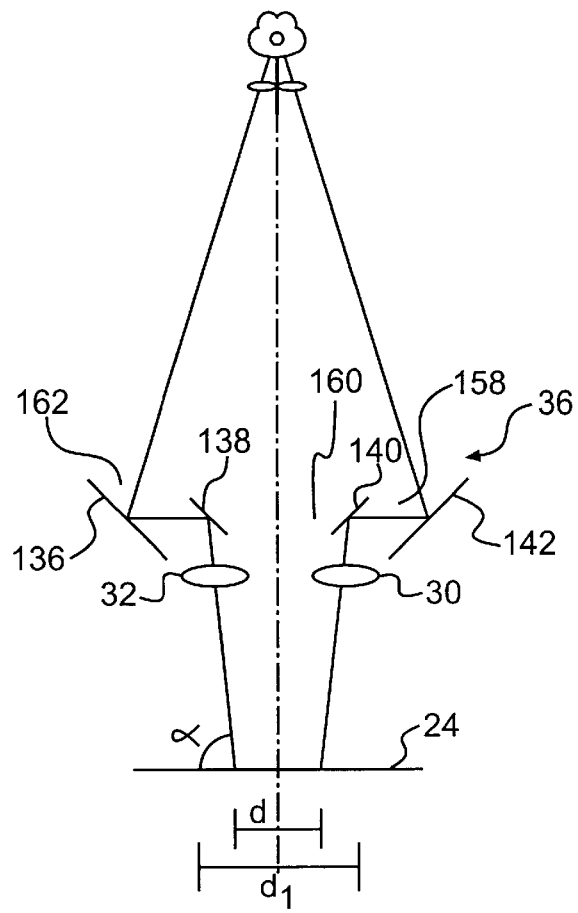
FIG. 10 is a schematic view of another preferred embodiment of a beam splitter and lens combination, illustrating the light paths from a subject to the film.

In this embodiment and as illustrated in FIG. 10, lenses 30 and 32 are separated by a distance $d_1$ that is greater than the distance d between the first and second images formed on film 24. Mirrors 138 and 140 are configured to direct light through lenses 32 and 30, respectively, at a slight angle to converge the first and second images so that they are separated by the correct distance. It should be noted that as the distance $d_1$ between lenses increases, the angle α at which the images strike the film increases. If angle α substantially diverges from 90°, the images captured on the film will become distorted.

Increasing the distance $d_1$ between lenses allows a greater distance between mirrors 138 and 140 for mono light passage 160. Thus, larger mirrors may be used without interfering with the mono mode. This allows the use of large aperture lenses in place of the previously described small aperture lenses. Large aperture lenses are generally considered superior to small aperture lenses for flash photography and will improve the marketability of the camera.

Preferably, beam splitter 38 is a fabricated design comprised of a chassis and four front silvered glass mirrors. The present invention contemplates, however, that the design can also be molded in one piece and vacuum plated on the appropriate polished surfaces to turn them into mirrors. Either design will allow for smooth and simple production of the beam splitter.

The operation of the aforementioned device will now be described with reference to the attached drawings. To take a stereo photograph, the camera starts in the stereo position illustrated in FIG. 4. In this position, lenses 30 and 32 are aligned with stereo apertures 62 and 66. Partition 28 is centered between the lenses and central portion 35 of lens panel 34 is aligned with mono aperture 64. Actuator 88 of shutter 26 is in the park position 96.

Before taking the photograph, the user must advance the film to the next exposure with the film winding mechanism. The operation of the film winding mechanism cocks a spring loaded striker mechanism. The striker is engaged and held in the cocked position by a shutter release mechanism.

After the user has selected a subject to photograph, the user depresses a shutter release. When the shutter release is pressed, the striker, under the tension of the spring, moves at high speed and strikes the end 94 of actuator 88, thereby imparting kinetic energy onto the actuator. This transfer of energy will continue until striker reaches the end of its travel and stops. The striker remains in contact with end 94 until the actuator reaches closed position 97. At this position, the striker stops but the kinetic energy imparted on actuator 88 will cause the actuator to continue to pivot and open shutter 26.

The kinetic energy imparted on actuator 88 causes it to pivot about pivot point 90. As described above, the pivoting of actuator 88 causes first blade 50 and second blade 52 of shutter 26 to open and allow light to enter apertures 62, 64, and 66. The first and second blades will continue to open until they reach the end of their range of motion or are stopped by the light sensitive mechanism. Alternatively, a pair of flash trigger contacts may interrupt the full opening of these blades. The flash trigger contacts may trigger the flash gun at a reduced aperture, which may be useful when close range flash photography is attempted.

When shutter 26 is opened, light is allowed to enter all three apertures 62, 64, and 66. However, because lens panel 34 blocks the light entering mono aperture 64, only the light reflected through the outer openings 130 and 134 of beam splitter 36 passes through lenses 30 and 32. Partition 28 prevents the light passing through each lens from interfering with the light entering the other lens. Thus, two stereo images are formed side by side on one piece of film 24.

The return spring 92 then acts against actuator 88 to return the first and second blades to the closed position 97. Actuator 88 moves towards the closed position until end 94 contacts the striker. In the closed position, the first and second blades prevent light from entering the camera.

The film winding mechanism is then operated to advance the film to the next exposure and cock the striker. As the striker is cocked, it moves to allow actuator 88 to return shutter 26 to the park position 96. The camera is then ready to take the next stereo photograph.

The camera may be switched to take a mono photograph by rotating knob 112 of selector 110 (referring to FIG. 3). The rotation of knob 112 causes lens panel 34 to rotate into the mono position as illustrated in FIG. 5. In the mono position, lens 30 is aligned with mono aperture 64 and partition 28 is moved to one side to avoid interfering with light passing through lens 30.

The shutter release is then depressed to release the striker as described above. The striker causes shutter 26 to open to expose each of the three apertures 62, 64, and 66. However, lens panel 34 prevents light entering the stereo apertures 62 and 66 from reaching film 24. Light entering the mono aperture 64 through the central opening 132 of beam splitter 36 is allowed to enter the camera body and pass through lens 30. Lens 30 directs the image to form a full frame mono image on film 24. The return spring 92 acts on actuator 88 to close the shutter. The user may then advance the film to prepare for the next photograph.

It will be apparent to those skilled in the art that various modifications and variations can be made in the construction of this camera without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A camera, comprising:
    a body having a mono aperture and a pair of stereo apertures; and
    a lens panel having a pair of lenses, the lens panel being moveable between a mono position where one of the pair of lenses is aligned with the mono aperture to project a single image of a subject on a film exposure and a stereo position where the pair of lenses are aligned with the pair of stereo apertures to project dual images of a subject onto a film exposure.

2. The camera of claim 1, wherein the lens panel is pivotably mounted in the body.

3. The camera of claim 2, further comprising a selector connected to the lens panel and operable to pivot the lens panel between the mono position and the stereo position.

4. The camera of claim 1, wherein the lens panel is slidably disposed in the body such that the distance between the lens panel and the apertures may be adjusted to focus the lenses on the exposure of film.

5. The camera of claim 1, further including a partition slidably disposed in the body between the lens panel and the exposure of film, the partition moveable between a stereo position where the partition is centrally located between the pair of stereo apertures to prevent the dual images from overlapping on the exposure of film and a mono position where the partition is removed from the mono aperture so as not to interfere with the single image projected by the mono aperture.

6. The camera of claim 5, wherein the partition is operably connected to the lens panel such that when the lens panel is moved from the mono position to the stereo position, the partition is moved from the mono position to the stereo position.

7. The camera of claim 1, further comprising a shutter assembly operable to simultaneously expose both the mono aperture and the stereo apertures for substantially the same period of time.

8. The camera of claim 7, wherein the lens panel is disposed between the shutter assembly and the exposure of film.

9. The camera of claim 7, wherein the shutter assembly includes a first shutter blade having a first pivot point and moveable between a closed position and an open position and a second shutter blade having a second pivot point and moveable between a closed position and an open position, the first and second pivot points disposed on opposite sides of the apertures.

10. The camera of claim 9, wherein the shutter assembly further comprises an actuator operable to move the first and second shutter blades to the open position to expose the apertures for a predetermined time period.

11. The camera of claim 10, wherein the actuator moves the first and second shutter blades from the closed position to the open position simultaneously.

12. The camera of claim 10, further comprising a spring acting on the actuator to bias the first and second shutter blades into the closed position.

13. The camera of claim 10, further comprising a striker configured to move into contact with the actuator to move the first and second shutter blades to the open position, wherein the striker moves into contact with a surface of the actuator with sufficient energy such that the surface of the actuator moves away from the striker when the motion of the striker is stopped.

14. The camera of claim 9, wherein the first shutter blade pivots away from the second shutter blade when the first and second shutter blades are moved into the open position.

15. The camera of claim 9, wherein each of the first and second shutter blades includes a body having three notches configured to simultaneously expose each of the apertures when the first and second shutter blades are moved to the open position.

16. The camera of claim 9, wherein the first and second shutter blades further include a partially open position wherein the first and second shutter blades cooperate to partially cover each of said apertures.

17. The camera of claim 1, further comprising a beam splitter having a mono light passage configured to allow light reflected from a subject to enter the mono aperture and a pair of stereo light passages having openings configured to allow light reflected from a subject into the pair of stereo apertures.

18. The camera of claim 17, wherein the distance between the openings of the pair of stereo light passages is approximately 65 mm.

19. The camera of claim 17, wherein the distance between the openings of the pair of stereo light passages is greater than the distance between the pair of stereo apertures and a series of a mirrors are disposed in the stereo light passages to guide light from the openings to the apertures.

20. The camera of claim 1, wherein the distance between the pair of lenses is substantially equivalent to the distance between the centers of the dual images.

21. A camera, comprising:
    a body having a first stereo aperture and a second stereo aperture;
    a first lens aligned with the first stereo aperture to project a first image of a subject onto a film exposure;
    a second lens aligned with the second stereo aperture to project a second image of the subject onto the film exposure adjacent the first image; and
    a beam splitter including a first light passage having at least two mirrors configured to direct light reflected from the subject through the first stereo aperture and the first lens and a second light passage having at least two mirrors configured to direct light reflected from the subject through the second stereo aperture and the second lens, such that the distance between the first lens and the second lens is greater than the distance between the first image and the second image.

22. The camera of claim 21, wherein the first and second lenses are mounted on a lens panel that is pivotably disposed in the body of the camera.

23. The camera of claim 22, wherein the body includes a mono aperture and the lens panel is movable to a mono position where one of the first and second lenses is aligned with the mono aperture to project a single image of a subject onto a film exposure.

24. The camera of claim 21, wherein each of the first and second lenses is a large aperture lens.

25. The camera of claim 21, wherein the distance between the first and second lenses is less than about 5 mm.

26. A shutter assembly for a camera having an aperture, comprising:

a first shutter blade having a first pivot point and moveable between a closed position and an open position;

a second shutter blade having a second pivot point and moveable between a closed position and an open position, the first and second pivot points disposed on opposite sides of the aperture, the first and second shutter blades cooperating to cover the aperture when said shutter blades are in the closed position; and an actuator operable to move the first and second shutter blades to the open positions to expose the aperture for a predetermined time period.

27. The shutter assembly of claim 26, wherein the first shutter blade pivots away from the second shutter blade when the first and second shutter blades are moved into the open positions.

28. The shutter assembly of claim 26, wherein the camera includes multiple apertures and movement of the first and second shutter blades from the closed position to the open position simultaneously exposes each of said apertures.

29. The shutter assembly of claim 28, wherein the camera includes three apertures.

30. The shutter assembly of claim 29, wherein each of the first and second shutter blades includes a body having three notches configured to simultaneously expose each of said apertures when the first and second shutter blades are moved to the open position.

31. The shutter assembly of claim 26, wherein the actuator moves the first and second shutter blades from the closed position to the open position simultaneously.

32. The shutter assembly of claim 26, further comprising a spring acting on the actuator to bias the first and second shutter blades into the closed position.

33. The shutter assembly of claim 26, wherein the first and second shutter blades further include a partially open position wherein the first and second shutter blades cooperate to partially cover said aperture.

34. A camera, comprising:

a body having a mono aperture and a pair of stereo apertures;

a pair of lenses; and means for moving the lenses between a mono position where one of the pair of lenses is aligned with the mono aperture to project a single image of a subject on a film exposure and a stereo position where the pair of lenses are aligned with the pair of stereo apertures to project dual images of a subject onto a film exposure.

35. The camera of claim 34, further comprising a shutter means for selectively exposing and covering the mono aperture and the pair of stereo apertures.

36. The camera of claim 35, further comprising a guiding means for guiding light reflected from a subject into each of the mono aperture and stereo apertures when the shutter means exposes said apertures.

* * * * *